April 30, 1929.  G. NERNAESS  1,710,783
VALVE FOR RESILIENT TUBES
Filed April 4, 1927

G. Nernaess
  Inventor
By: Marks & Clerk
  Attys.

Patented Apr. 30, 1929.

1,710,783

UNITED STATES PATENT OFFICE.

GUSTAV NERNÆSS, OF HOP, NEAR BERGEN, NORWAY.

VALVE FOR RESILIENT TUBES.

Application filed April 4, 1927, Serial No. 180,908, and in Norway April 15, 1926.

The object of this invention is to provide a valve adapted to be used in connection with resilient tubes, such as rubber tubes and the like. Another object is to provide a valve which is easy to handle and which may be operated entirely by the mouth; another object is to provide a valve especially adapted for use in connection with air cushions, air filled life jackets and the like, and which automatically shuts off the communication with the said cushion or jacket when the filling of the same with air ceases.

Figure 1:
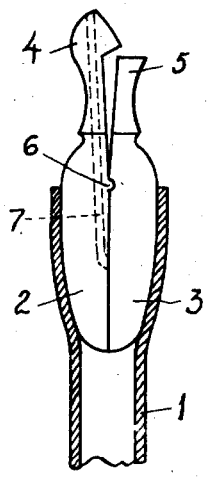
Figure 2:
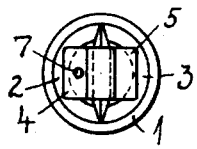

One embodiment of my invention is illustrated by way of example on the annexed drawing at which:

Fig. 1 shows the valve seen from one side thereof, the tube being shown in section, and Fig. 2 shows the valve seen from the top end.

The valve constitutes a somewhat conically shaped plug, the size of which is so chosen in relation to the tube 1 in which it is to be inserted, that the plug when inserted in the tube will be held firmly thereby. The plug is divided in two halves, preferably along a middle plane parallel with the longitudinal axis of the tube, and in such manner that the opposite faces of the two halves 2 and 3 are exactly even and are pressed airtight together by the pressure which the surrounding tube 1 exerts. Each of the halves 2 and 3 are provided with an extension, 4 and 5, respectively, which project beyond the end of the tube. Each of the extensions is provided with a flattened surface which surfaces normally do not make contact with each other but form an acute angle therebetween, as shown in Fig. 1.

Through the extension 4 and part of the proper member 2 is arranged a channel 7 the inner end of which opens against the flat surface of the member 3 whereby the said inner channel end is normally closed by the member 3. The outer end of the channel 7 opens into the air at or near the top of the extension 4.

Near the upper end thereof one of the conical halves is provided with a transverse rib 6 of rounded or semi-circular cross section, fitting into a corresponding groove in the other conical member. Just at this rib the flat surfaces of the extensions begin to diverge from each other. Thus the said rib will serve as a sort of hinge if the extensions 4 and 5 are moved against each other by pressure being exerted thereupon, and thereby the halves 2 and 3 are moved away from each other so that the inner opening of the channel 7 becomes free and communication is established from the outer end of the channel and the interior of the tube 1.

As will be seen the extensions 4 and 5 form a sort of mouth piece the members of which may easily be pressed together by means of the teeth, whereupon air may be blown into the tube 1 by means of the mouth. Therefore my valve is well adapted for use in connection with air cushions, life jackets and similar means which are to be easily filled with air, and preferably without the necessity of using the hands or fingers for operation of the valve. It will also be seen that my valve is self-controlling in that it, due to the elasticity of the tube 1, immediately shuts off the connection between the channel 7 and the interior of the tube 1 when the extensions are no longer forcibly pressed against each other.

Having now particularly described and ascertained the nature of my said invention and in what manner the same is to be performed, I declare that what I claim is:

1. A valve for resilient tubes comprising a plug adapted to be inserted in the end of such tube, said plug being composed of two parts having opposing plane surfaces, a channel extending through one of the parts, said channel opening against the plane surface of the other part, said parts at the upper end of the opposing inner surfaces thereof being provided one with a transverse rib of suitable cross-section and the other with a corresponding groove for receiving said rib.

2. A valve according to claim 1 in which each of said parts is provided with an extension protruding past the end of the tube, said extensions diverging from each other outside of the tube, the channel extending through one of the parts and its extension.

GUSTAV NERNÆSS.